United States Patent
Grupe

[11] 3,935,438
[45] Jan. 27, 1976

[54] DECIMAL ADDER

[75] Inventor: Ulrich Grupe, Stuhr, Germany

[73] Assignee: Vereinigte Flugtechnische Werke-Fokker GmbH., Bremen, Germany

[22] Filed: Oct. 11, 1974

[21] Appl. No.: 513,956

[30] Foreign Application Priority Data
Oct. 20, 1973 Germany............................ 2352686

[52] U.S. Cl................................. 235/174; 235/168
[51] Int. Cl.².......................................... G06F 7/50
[58] Field of Search ............ 235/168, 173, 174, 175

[56] References Cited
UNITED STATES PATENTS

| | | | |
|---|---|---|---|
| 3,189,735 | 6/1965 | Gunderson et al. ............ | 235/174 X |
| 3,629,565 | 12/1971 | Schmookler et al................ | 235/174 |
| 3,711,693 | 1/1973 | Dahl ..................................... | 235/174 |
| 3,752,394 | 8/1973 | Igel ..................................... | 235/174 |

Primary Examiner—Malcolm A. Morrison
Assistant Examiner—Jerry Smith
Attorney, Agent, or Firm—Ralf H. Siegemund

[57] ABSTRACT

A decimal adder has plural arithmetic stages, each for generating one new bcd digit, and a controller for all stages. Each stage has three, four-stage binary adders one as input receiver for one input bcd digit, one main adder and one as output corrector. The input adder adds six to that one input bcd digit for a true addition, the output adder adds ten (or subtracts 6) selectively under various conditions. The second bcd digit for a stage is either passed directly to the main adder or its 16-complement; the second input for the main adder is the output of the input adder. The output of the main adder is either fed directly or its 16-complement to the output adder. The controller controls selectivity of operation of input adders and complement input formation in all stages in response to equal or unequal sign bits. The controller controls formation of complement of the output of all main adders when the overall result is negative but not because both sign bits are negative. The add-ten of the output adder in each stage is controlled on the basis of the carry bit generated by the main adder in the particular stage and in response to the sign of the overall result. The carry in - carry out chain from stage to stage is closed in a loop through the controller, generating a carry-in bit for the subtract operation when the resultant sign is positive. This loop represents the sign of overall result in case of subtraction.

23 Claims, 3 Drawing Figures

DECIMAL ADDER

BACKGROUND OF THE INVENTION

The present invention relates to improvements in decimal, parallel adders and more particularly, the invention relates to such adders wherein each decimal position has an input adding stage, a main adding stage and a correcting stage behind the main adding stage.

Parallel adders are used generally for decimal (bcd) or straight forward binary addition or substraction wherein digits in corresponding positions are processed in parallel rather than serially. The main purpose of a parallel adder is saving of time as compared with serial adders. Of course, parallel adders are quite expensive so that their use has been limited e.g., to high speed computers.

THe development of integrated circuits has reduced the cost for hardware to such an extent that the more involved circuitry of a parallel adder adds only little to the cost of any device in which the adder is to be incorporated. As a consequence, parallel adders are not being used more frequenty. A typical parallel adder is described, for example, in "Control Engineering", Oct. 1972 issue, pages 48, 49. This adder has two input adding stages and one main adding stage and a correcting stage, for each decimal position. As shown in FIG. 2 of that publication, a complement forming stage is provided for each input digit so that the adder can provide for substraction as well.

This particular adder, though rather involved, is still not capable of some important arithmetic operations. For example, such an adder cannot substract numbers having in their higher decimal positions zeros. This is a significant drawback as it is frequently desirable to fill all positions with numbers, whereby leading zeros are used in the higher nonparticuipating positions for the numbers. Rarely are adders used to capacity of its format, and the highest significant digit of any number quite frequently does not occupy the highest available position. Also, a subtraction of a larger number from a smaller one is not possible, but will result in the respective ten complement. Still furthermore, one cannot add negative numbers. In other words, these last mentioned operations, if needed, (and they always are) must be provided for by still additional circuitry. These drawbacks are, therefore, quite significant.

DESCRIPTION OF THE INVENTION

It is an object of the present invention to improve adders of the type referred to in the introduction so that the aforementioned limitations are obviated.

In accordance with the preferred embodiment of the present invention it is suggested to construct the individual arithmetic stages (generating one decimal output digit) in that each such arithmetic stage receives a digit of a first number via the input adder stage and a digit of corresponding position of a second number via a complement forming stage. Both numbers are then fed to the main adder stage and the output of the latter passes to a correcting stage via another complement forming stage. The correcting stage is controlled from the inverted transfer carry of the main adder stage and/or from a controller for purposes of corrections.

More specifically, two bcd digits entered in such a arithmetic stage (defined as unit processing one decimal position) are processed in that either "six" is added to one digit while the other remains unmodified, or the binary complement is formed of one digit while the other remains unmodified. The so processed two bcd digits are added in a binary adder with or without inclusion of a carry from a stage below and resulting in either case in a bcd digit with or without production of a carry. The result of that adder either remains as is or is inverted and in the correcting stage the number ten is or is not added (equivalent to a subtraction of six). The selection of these functions is under control of a controller responding to the sign bits of the numbers entered and further responding to a carry-overflow bit from the stage of highest significance.

Aside from forming the resultant sign bit, the controller controls in mutually exclusive fashion the adding of six and complement formations of one of the inputs. The controller controls also the formation of the complement of the output of the respective adder in all stages in dependance upon the sign bits and the recycled highest stage carry. The adding of 10 to the output in any stage is controlled in dependance upon any carry formed in that stage and in further dependance upon inversion of the output of the main adder in the stage.

It is significant that the transfer carry connection from the controller to the latest significant arithmetic stage, from stage to stage, and from the stage for the highest significant decimal digit back to the controller, does not only have regular arithmetic carry-borrow functions but participates in the distinction between complement formation by subtracting a number from fifteen, and control of generating a modulo 16 operation.

As a result of these provisions, straight forward addition of two digits is carried out by adding six and again ten which gives the sum of the digits in an overall modulo 16 operation. The same is true if a carry is added from a stage below. If the two digits exceed 10, then the internal operation provides for the adding of 6, but the main adder already provides for modulo 16 operation, and ten is not added so that the sum of the digits minus ten is formed under production of a carry for the next stage. The addition of two negative numbers treats them as positive numbers which are added in the same fashion, but under formation of a negative sign bit for the output by the controller.

On subtraction, one number is inverted which amounts to formation of fifteen minus that number. Moreover, if the overall result is positive, a carry is forced into all arithmetic stages causing modulo 16 in the main adder of each stage. "Ten" is or is not added depending on whether or not the subtraction of two digits requires a borrow. Whereby, selective borrow operation may interrupt the chain of carries, but operation of the stage or stages processing highest significant digits ensures proper continuation of carry or no-carry propagation. If the overall result is negative, no carry is forced into the stages, but the output of the main adder in each stage is inverted again so that fifteen is first added and then again subtracted. Depending on the need for a borrow, ten is or is not added.

The formation of transfer carry bits in the one of the highest stages and its recycling permits that all higher, nonparticipating stages may receive zeros, and the resulting digit will be zero while the carry bit from the highest participating stage is permitted to propagate through (or, if there is no carry bit none will be produced by the nonparticipating stages).

DESCRIPTION OF THE DRAWINGS

While the specification concludes with claims particularly pointed out and distinctly claiming the subject matter which is regarded as the invention, it is believed that the invention, the objects and features of the invention and further objects, features and advantages theeof will be better understood from the following description taken in connection with the accompanying drawings in which:

GENERAL LAYOUT

Figure 1:
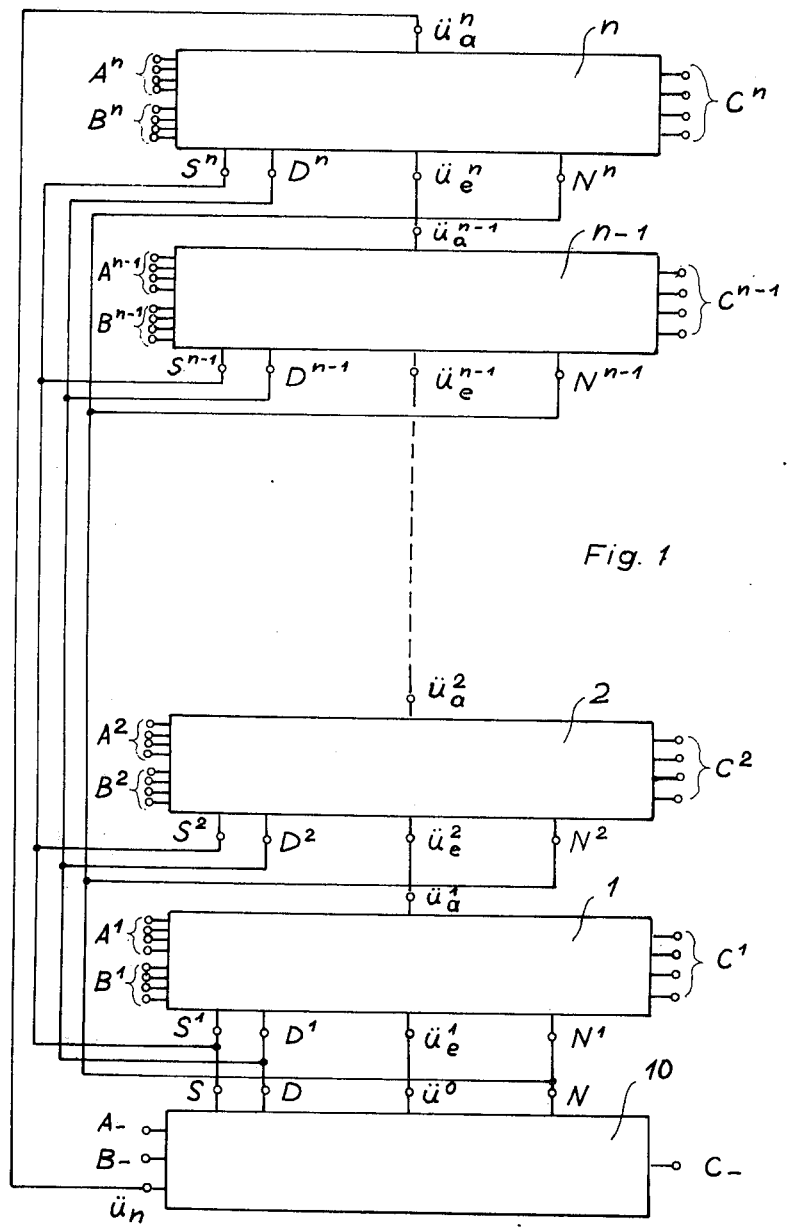
FIG. 1 is a block diagram of the principle layout of an adder in accordance with the preferred embodiment of the invnetion.

Proceeding now to the detailed description of the drawings, FIG. 1 shows $n$ arithmetic stages 1 through $n$ of a parallel adder permitting the addition of two numbers with up to $n$ decimal positions each. The ascending order of stage identification signifies also digital significance, stage 1 operating on least significant digits, stage $n$ operating on the digits of highest significance. Each arithmetic stage generates one new decimal digit in response to two input digits. Accordingly, each stage has two inputs or input channels A and B with high indices used for identifying the stage to which such input pertains. High indices are used throughout for identifying an input or output line or signal from a particular stage.

Each input channel has four lines to receive decimal digits in the form of bcd signals.

Each stage has a transfer output line Ua respectively connected to a transfer input line Ue of the next higher stage. Thus, line $Ua^1$ of stage 1 connects to $Ue^2$ of stage 2 etc., line $Ua^{n-1}$ of stage n−1 connects to line $Ue^n$. The signals transferred via these n-lines are carry bits.

Reference numeral 10 denotes the controller for the adder having as primary inputs the sign bits for each of the two numbers to be processed. The sign bits and their controller inputs are indentified by A− and B−. The transfer input line $Ue^1$ of stage 1 connects to a particular output line $U^o$ of the controller, while line $Ua^n$ of highest stage $n$ connects to an input line Un of controller 10, thereby closing, in effect, a transfer loop.

Each stage has additionally three control inputs S, d and N with high postscript used to indentify the stage. These control inputs are bussed and are connected to branch off common outputs S, D and N of controller 10. Thus, these control lines are applied to all arithmetic stages in unison while the respective signals are generated in the controller.

The bcd, four line outputs of each arithmetic stage are denoted by character C again with high postscripts identifying the respective generating stage. The output line C− of controller 10 represents the sign of the resulting number.

ARITHMETIC STAGES AND CONTROLLER

Figure 2:
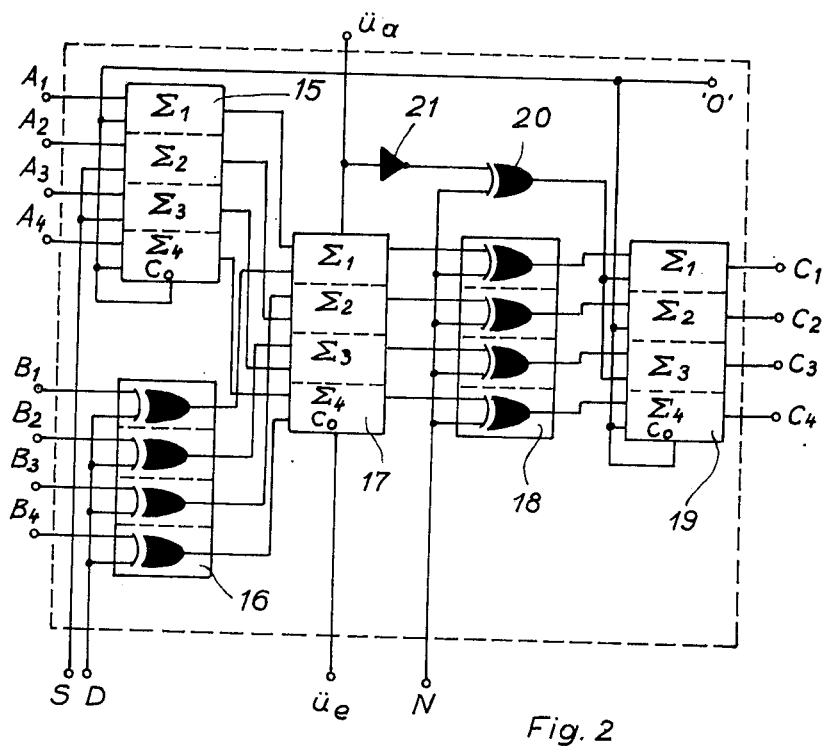
FIG. 2 shows the circuit for one decimal position.
Figure 3:
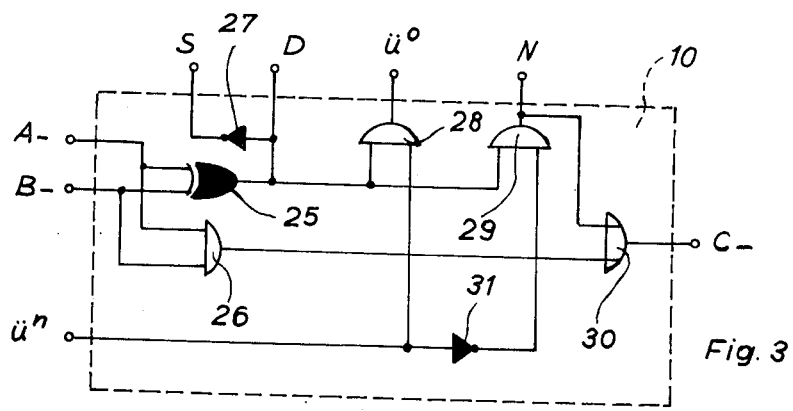
FIG. 3 shows the circuit of a controller used in the adder.

All arithmetic stages are constructed similarly, only controller 10 differs from them. The individual arithmetic stages will now be described in detail and with respect to FIG. 2; stage identifier subscripts have been omitted as unnecessary for that purpose. Summarily, such a stage has an input adding network 15 connected to lines A; a complement network 16 connected to lines B; a main adding stage 17 connected to the outputs of 15 and 16; a complement forming network 18 connected to the outputs of stage 17; and a correcting network 19 connected to 18.

The input adder 15 is a four stage, straight forward binay adder which will never be called to generate a sum exceeding fifteen. The four input lines for bcd signals representing the one digit are denoted $A_1$, $A_2$, $A_3$ and $A_4$, and they are connected to one input each of the four stages of adder 15. The respective other inputs of the highest and of the lowest substages are connected to a common line 0 which thereby sets the second inputs of the highest and lowest binary stages in adder 15 to zero. Line O connects also to the carry input of that adder.

The two stages in adder 15 are connected to receive the signal on line S from controller 10. That signal is high (1) or low (0). When high, adder 15 adds in effect, the decimal number six to the A input digit. When S is low, zeros are added so that the A digit passes adder 15 unmodified.

The corresponding four lines $B_1$, $B_2$, $B_3$, $B_4$ representing also four bcd signals of the digit of the second number, connect to four exclusive Or-gates of stage 16 each receiving in addition the control signal on line D from the controller. The control signal on line D in fact defines whether the output of each exclusive Or-gate is equal to or the complement of its respective B input bit. One can also say that for each four-bit input B, stage 16 forms (15 − B) when D is high.

The four outputs of adder 15 and the four outputs of inverter 16 are combined in pairs as inputs for the four adding stages of binary adder 17. The adder has a carry input which connects to input $u_e$ of that particular arithmetic unit. When the carry bit is one, a "one" is added to the least significant stage of adder 17. The adder 17 is a straight forward binary adder whose output is the sum of its inputs modulo 16. Whenever the output exceeds 15, adder 17 provides a carry bit to output line Ua.

Adder 17 has four outputs, one per adding stage, which are respectively connected to one input each of four exclusive Or-gates in assembly 18. The respective second input of all of these gates connects to the control line N from controller 10. The signal in line N determines whether impliment or complement of the outputs of adder 17 are to be provided by the outputs of the four exclusive Or-gates of 18. It will be seen that this will depend on whether the overall output is positive or negative when the two input numbers have oposite sign.

The signal in line N is also applied to an exclusive Or-gate 20 which receives as a second input the inverted signal on carry-out line Ua (inverter 21). The output of exclusive or gate 20 is connected to two of the four adding stages in the correcting unit 19. Unit 19 is again a straight forward binary adder which also operates on a modulo 16 basis. However, a carry-out bit is not taken from adder 19. Also, its carry input is set to zero by connection to low-biased line 0.

Each of the four adding stages in 19 receives one bit from one of the exclusive Or-gates 18. The output of exclusive Or-gate 20 connects to the second input of the highest and of the second least significant adder stages in 19, while the two other stages have their second input connected to line 0. Thus, when the output of exclusive Or-gate 20 goes high, a decimal 10 is added by adder unit 19 to the number as derived from the outputs of exclusive Or-gates 18 which is equivalent of a subtraction of 6 by virtue of the modulo 16 operation of adder 19.

The four output lines $C_1$, $C_2$, $C_3$, $C_4$ from stage 19 represent the output digit of the respective operation, again in bcd format. It should be mentioned at this point, that the bcd digits A and B as applied and the bcd digit C generated by such an arithmetic stage operates as if these numbers were positive. The sign of any input number affects such operation indirectly only through the control signals S, D, and N and through the carry bit formation process.

Turning now to the controller 10, it provides command and control signals to lines S, D, U° and N in response to sign bit signals A−, and B− as well as in further response to the highest stage carry output $U^n$. In addition to control signals for the adder stages, controler 10 forms the sign bit C− of the result.

Specifically, an And-gate 26 responds to coincidence of two bits indicating negative sign of both input numbers to produce a negative sign bit via one input of a regular Or-gate 30 whose output is the sign bit C−. This straight forward formation os a negative sign bit C− out of two negative sign bits A−, B− occurs only when both input numbers are indeed negative. If only one input is negative, the sign of the result is directly determined by signal N constituting the second input for the sign bit forming Or-gate 30.

It should be mentioned here that upon implementation the more common nand and nor logic will be used, but straight forward and/or logic facilitates understanding of the invention, and the change in logic presents no problem.

The two symbols are, additionally, fed to an exclusive Or-gate 25 whose output controls the common line D. One can readily see that the line D is e.g., high for unequal sign bits only and low for similar sign bits of the two numbers, representing positive or negative signs as the case may be. An inverter 27 is also connected to the output of exclusive Or-gate 25 and it can readily be seen that the outputs, as controlled by inverter 27 is the complement of D. S is high when the sign bits are equal (positive or negative) and low when they are unequal; signal D has opposite characteristics.

It can thus be seen, that either exclusive Or-gates 16 in all arithmetic stages form the complement of the input digits B, or six is added to each input digit A, because one of the other of D and S is high while the respective other one is low.

The output of exclusive Or-gate 25 is connected additionally to one input each of two And-gates 28 and 29, the former furnishing the carry signal U° to be applied as carry to the least significant stage 1 while gate 29 provides the control signal for line N. Both gates are enabled only when the sign bits differ; the signals U° and N are both low by necessity when the input numbers have similar sign bits.

The signal gates through by gate 28 when open on unequal sign bits is the carry signal from the highest stage, $U^n$. An inverter 31 provides the complement of that highest stage carry signal to feed it as second input to gate 29. Thus, signal U° follows the highest stage carry $U^n$, and N is complementary thereto, but only when the input numbers have unequal sign bits, otherwise U° and N are both low regardless of that highest stage carry.

As stated above, the output of gate 29, i.e., the signal in line N serves as alternative input for Or-gate 30 and thus establishes the alternative sign bit for the output. It will be recalled, that the first input of gate 30 determines the sign bit C− as a negative only when both input numbers are negative. In any other cases, signal N determines the sign bit of the resulting number.

OPERATION (ADD)

The operation of the adder will be explained next with reference to specific examples, applied to a single arithmetic stage first. For adding two decimal digits A and B under the assumption that this sum C is smaller than 10, the respective stage realizes the following operation:

$C = (A + 6) + B - 6 = A + B$

This means, that input adder 15 adds 6 to digit A and stage 17 adds B thereto. Since $A + B < 10$, it follows that $A + B + 6 < 16$ so that no carry is produced by 17. It is further presumed that the numbers to which these digits pertain (or constitute) are positive so that the outputs of both gates 25, 26 are low, D, U° and N are low accordingly but S is high. Whether or not the digits pertain to numbers whose sum is larger than the format permits is unimportant as only the overflow indicator will respond to a $U^n$ carry; controller 10 will not respond. C− is low as both N and the output of 26 are low.

Since S is high, input adder 15 adds the number 6 to the decimal digit A as applied in bcd format to lines $A_1$, $A_2$, $A_3$, $A_4$. Since D is low exclusive Or-gates 16 pass B unmodified and adder 17 forms the sum $(A + 6) + B$. The four bit format (decimal number 15) could be exceeded in adder 17 only if there is a carry $U_e$. Assuming this not to be the case, the output of 21 will be high and, N being low, gate 20 is high so that correcting stage 19 adds the 16− complement of 6, i.e., 10, to the output of exclusive Or-gates 18 which is the equivalent of subtracting 6 from the number $A + B + 6$ as provided by stage 18. Exactly the same operation will ensue if $A + B + 1$ (i.e., carry $U_e$ being applied from a lower stage to the arithmetic stage is considered) is still smaller than 10. The output lines $C_1$, $C_2$, $C_3$, $C_4$ will hold the sum $A + B$ or $A + B + 1$ in bcd notation, and a low C− denotes positive sign.

It may now be assumed that a carry results from adding the two digits A and B with or without a carry $U_e$ being applied from a lower stage so that $A + B$ (or $A + B + 1$) is equal to or larger than 10. Since we still consider just addition, both A− and B− are low, so that S is high and D is low; stages 16 and 15 operate as before accordingly and 17 forms $A + B + 6$ (+ 1), under the assumption that this sum is larger than 15.

The operation carried out on this number as provided by adding stage 17 is the subtraction of 16 as 17 is a modulo 16 adder, so that the result will be $C = ( (A + 6) + B) - 16 = A + B - 10$.

In other words, adder 17 does already provide that number C and stage 18 merely transfers it. Since $U_a$ has gone high, the output of 21 is low (N is also low) so that indeed nothing is added in stage 19, and the number $A + B - 10$ (+ carry Ue if any) appears at C, which is indeed correct. The suppressed 10 is transferred to the next arithmetic stage as carry signal $U_a$.

The operation as outlined above is also applicable for $A = B = 0$ resulting in $C = 0$, so that higher stages, not in fact being used, generate zero output digits. This concludes all possibilities as to straight forward addition of possitive numbers.

OPERATION (SUBTRACT)

In the case of subtraction, one has four possibilities. $A - B \geq 0$, $A - B < 0$ as to individual digits, at a positive sign of the resultant difference number, or for a negative sign of the resultant difference. The most simple case $A - B \geq 0$ with positive overall result presents itself as follows. B— is high, so that 25 and D are high, S is low, and both, 28 and 29 are enabled by exclusive Or-gate 25. Since we assume at first that the overall result of the subtraction is positive, N must be low and $U^o$ and $U^n$ must be high. That the latter is indeed true will be vertified later.

Now, with S low and D high, digit A passes adder 15 without augmentation (6 is not added) while stage 16 forms the complement or $\bar{B}$. Additionally, it was assumed that $U^o = U_e$ is high so that stage 17 forms $(A + \bar{B}) + 1$. Strictly speaking that applies only to the first arithmetic stage whose carry input is connected to receive $U^o$. That the same is true for higher stages will be vertified shortly. $\bar{B}$ is actually $15 - B$, as generated by these four exclusive Or-gates 16. Moreover, it must be born in mind that + means arithmetic plus and is not a Boolean algebra symbol. Thus, stage 17 is called to perform the addition $A + 15 - B + 1$. Since $A \geq B$ was assumed, overflow is definitely produced in stage 17 so that carry bit $U_a$ goes up. Thus, the carry input of the next arithmetic stage will definitely receive a carry bit so that indeed these arithmetic operations are presently developed may apply to all cases. That the resulting carry-out signal $U_a$ from at least one of the arithmetic stages will in fact propagate through all stages of the adder will be shown shortly, to show that ultimately $U^n$ is high, which in turn causes $U^o$ to go high and N to go low as is presently assumed.

Since N is low, stage 18 transfers the output of adding stage 17 to adding stage 19. Since $15 + 1$ is zero in a modulo 16 adder (as is the case in a four stage binary adder), the output of 17 is, in effect $A - B$. Since $U_a$ goes up, the output of 21 is low, so is N and the number added to $A - B$ in 19 is zero, so that indeed $A - B$ appears at output C.

It must now be vertified why $U^n$ is high in this operation. Since the overall is to be positive, the digits of highest significance must satisfy thee condition $A \geq B$ (or even, $A \geq B + 1$, if there was a borrow from below), and the highest participating arithmetic stage does produce a carry bit $U_a$ accordingly. The next higher stages up to $n$ receive zeros at their $A_1$, $A_2$, $A_3$, $A_4$ and $B_1$, $B_2$, $B_3$, $B_4$ inputs.

Since S is low and D is high the respective input adders 15 transmit all zeros, stage 16 transmits all ones (or 15). Since the respective input $U_e$ receives a carry signal from the proceding arithmetic stage, adder 17 performs a $15 + 1$ addition which results in zero output at the C— terminals concurring with a carry on the respective output $U_a$ which becomes the carry input for the next arithmetic stage whose A and B inputs receive also all zero bits etc. until the last stage produces $U^n$ closing the loop through the controller. This however, means that $U^o$ is dependant on a high $U^n$ so that it must be shown that at least one adding stage 17 will produce a high $U_a$ (thereby starting the chain of carry propagation) irrespective of a $U_e$ value at its carry input. As will be shown shortly, the failure of a stage to receive a $U_e$ bit is due to a borrow from the stage below.

Going back to the operation of adder 17, it was presumed that for $A - B \geq 0$, but adder 17 is effect performs $A + 15 - B$ if there is no carry from below, this then can be restated as $A + 16 - (B + 1)$ or $A - (B + 1)$ as far as the C output is concerned. A carry $U_a$ will be produced by that arithmetic unit, even if there is no high carry $U_e$ ($-U^o$), as long as $A - B \geq 1!$. That situation must exist in at least one arithmetic stage if the difference between two milti digit numbers is to be positive. That one stage is, therefore, the initiator of the carry bit that transfers throughout the circuit and set $U^o = 1$ and $N = 0$.

There remains, therefore, only the situation that the two numbers to be subtracted from each other are identical, that $A = B$ in all arithmetic stages. If $A = B$ in a stage then 17 will (in the absence of a carry) produces four ones and no carry. Since $U^o$ is low, N will now be high, 21 goes high in all stages. Thus, stage 18 will convert the four ones of stage 17 into four zeros to which nothing is added in 19 so that C is all zero output.

None of the other stages receives a carry either, but again that does not matter as now 17 will also produce the number 15 in each case (or four ones). Since N is high in this case (no carry being produced anywhere), inverter 18 converts these four ones of stage 17 into four zero in each instance, to which nothing is added. Thus, for $A = B$ an all zero output is produced, whereby for this particular case, no carry is produced but N does go up. Thus, an all zero output is indicated by a negative sign bit which is actually of advantage as it indicates that the all zero output is the result of a substraction and not because of all zero inputs of an addition.

The next operation to be considered is the subtraction $A - B < 0$, but still under the assumption that the overall result is positive. Hence, we continue to presume that N is low and $U^o$ is high.

Since B— is high and A— is low, D is high and S is low. Thus, nothing is added to A by adder 15 while 16 does form $15 - B$. The carry input $U_e$ is high either because of its connection to $U^o$, or because it receives a carry from below, i.e., from a stage whose inputs satisfied the condition $A - B \geq 0$. The case of no carry input will be considered also.

Adder 17 forms $A + 15 - B + 1$. For $A < B$, the addition in 17 cannot produce an overflow so that $U_a$ will not be produced. If the stage does not receive a carry input, 17 forms $A + 15 - B$ and that is even smaller than 15. Thus, in either case, no carry-out $U_a$ will be produced. Consequently, the output of 21 goes up and, N being low, exclusive Or-gate 20 passes a signal to adder 19 representative of adding 10 to the number applied by exclusive Or-gates 18 to 19. Since N is low the exclusive Or-gates 18 serve only as transfer stages for output from 17 which, as stated above, is $A - B + 16$ or $(A - B + 15)$, so that 19 now forms $A - B + 16 + 10$. As that number is positively in excess of 16 (16 being 0 in this binary adder); the signal at C is $A - B + 10$, or $A - (B + 1) + 10$ consistent with a borrow from the arithmetic stage below. Hence, a borrow is an absence of a carry, and presently the stage produces such a borrow as a $U_a = 0$.

It should be noted again, that this situation does not produce a transfer signal $U_a$, while $U^n$ must be high. This is still consistent as $B > A$ cannot possibly occur in the highest decimal position for a subtraction with positive result. That requires for the highest stage $A \geq B$ and, as was outlined above, such a subtraction does produce a transfer carry $U_a$ which then propagates through the highest stages as will be shown shortly.

Now we turn to the second group of substract operations, where the overall result is negative. The controller 10 has to maintain a condition wherein N is high for the production of the negative sign bit (the special case of both numbers being negative will be considered later). N can be high only for unequal sign bits and for a low transfer carry $U^n$. Also, a high N means low $U^o$. As before we shall verify later the fact that $U^n$ is indeed low in this case.

Again we consider first the situation of $A \geq B$ for zero carry input $U_e$ (or $A + 1 \geq B$ if there is a carry input $U_e$). Since again S is low and D is high, stage 16 provides $15 - B$ and adder 17 provides $A - B + 15$ (or $A - B + 1 + 15$ if there is a carry). Now, since N is high, exclusive Or-gates 18 provide the complement or $15 - A - 15 + B = B - A$, or $B - (A + 1)$ if there was a carry from below. If 17 does provide a carry, then $A \geq B$ with N high and $U_a$ high (output of 21 low) exclusive Or-gate 20 controls correcting stage 19 to add 10 to the result, so that the output at C is $10 + B - A$ or $10 + B - (A + 1)$ if there was a carry from below.

It is clear that the condition $A \geq B$ or even $A \geq B + 1$ is not possible for the highest digits of a subtraction when the overall result is to be negative. This requires $A < B$, or at least $A < B + 1$ depending on the carry-borrow situation in the stage below. Assuming first that a carry was produced by the stage below, then adder 17 receives and forms $15 - B + A + 1$. If a carry was not produced in the stage below, adder 17 forms $15 - B + A$. In order to establish the condition of a negative resultant sign bit, an overflow must not occur in 17, i.e., $15 - B + A$ or $15 - B + A + 1$ must not exceed 15. Then and only then will there be no carry $U_a$ issued from the highest participating arithmetic stage. That this absent carry bit will propagate as such through the not participating stages ($A = B = 0$) so that $U^n = 0$ be maintained will be shown shortly.

Continuing with the forth case, $A < B$ and overall negative result, N is high everywhere and $U_a$ is low in the particular stage considered; 21 is also high and exclusive Or-gate 20 will not produce an output. Thus, exclusive Or-gates 18 will form the complement of the output of adder 17 but adder 19 will not add anything thereto. The output C now produced by the arithmetic stage is $15 - 15 + B - A$ (or $15 - 15 + B - A - 1$ if there was a carry situation from the stage below). The result is, therefore, $C = B - A$ or $B - 1 - A$ which is indeed correct in either case.

Finally, it must be verified that no carry from stages below ($U_e = 0$) and $A = B =$ will not result in a $U_a = 1$, so that higher nonparticipating stages receiving only zeros as inputs will in fact produce, finally $U^n = 0$ which is the necessary condition for establishing $N = 1$. $A = B = 0$ and $U_e = 0$ puts decimal number 15 into adder 17 with no overflow incurred. Hence, $U_a = 0$ as required. Stage 18 provides all zeros and high 21, high N blocks exclusive Or-gate 20 so that nothing is added at 19. The outputs C will all be zeros.

Finally we come to the specific addition of two negative numbers. $A- = B- = 1$ so that 26 provides the negative sign bit (through Or-gate 30) $C-$. Exclusive Or-gate 25 provides zero output just as in the case of addition so that S is high and D is low. Since the output of 25 is low, $U^o$ and N are low. Thus, as far as the control of the arithmetic stages by the controller is concerned, they just add the numbers and the situation is exactly as described above with regard to addition. The production of a carry in each stage is of significance only in the next stage. A carry in $U^n$ is only an overflow indication. Thus, the result of $-A -B$ is represented as $A + B$ on the C outputs, but sign bit $C-$ indicates that it is in fact a negative resultant number.

It should be mentioned, that the circuit as described thus far will also process $-A + B$, but the result will have the incorrect sign. This is not a detriment as one can readily avoid this case and put the number to be subtracted always into the second decimal number position B. However, it can readily be seen, that $-A + B$ can also be provided for; it is merely necessary to form the complement of N for this case. In other words, and in Boolean terms, the controller may have another And-gate feeding a third input of Or-gate 30 by the logic signal $A.\bar{B}.\bar{N}.$, while the input N for gate 30 as illustrated will be replaced by a gated signal termed $\bar{A}.B.N$. Alternatively, one could switch the input connections between the A and B lines on one hand, and the units 15, 16 around and obtain the same result. Obviously, that is considerably more involved hardware-wise.

It can readily be seen, that the adder is capable of performing all decimal additions and subtractions in parallel without limitations and is, thus universally employable. Using this network in and as part of an arithmetic-logic unit is quite possible; And-gating of all-zero outputs to determine the logic function of equality-inequality; detection of sign for a larger/ smaller comparing funtion; forming the decimal complement of a number through additional control of N; adding one to a number or to a sum through additional control of $U^o$, are all merely augmentations of the controller to respond to logic commands in the indicated fashion.

Another point to be considered is the following. Each arithmetic stage has one input in which selectively the complement is formed or not, while the other input has or has not 6 added. These two input modifiers are mutually exclusive so that both of them could be conducted on one and the same input e.g., the A's input, while lines B feed directly to adder 17. However, that is more involved hardware-wise and the illustrated circuit is clearly preferred.

Another modification can be seen directly in the following. The adders including 17 are constructed from bistable units e.g., flip-flops. Hence, each stage in adder 17 does already provide the complement. Thus, in lieu of exclusive Or-gates 18 one can uses N and $\bar{N}$ - "and" gating of complement and direct outputs of these adder stages.

It should be mentioned finally, that the term "adder" as used here, particularly for input and output adders 15 and 19 could be understood also as hard wired subtractors because in one instance (15) one could subtract 10 and 19 could subtract 6 when called for. These operations are deemed strictly equivalent on the basis of the modulo 16 operation these adders will perform in either case.

The invention is not limited to the embodiments described above but all changes and modifications thereof not constituting departures from the spirit and scope of the invention are intended to be included.

I claim:

1. A decimal parallel adder comprising:
   a plurality of arithmetic stages, one each for forming a new decimal digit, each such stage having a first binary adder for receiving signals representing a first and a second digit to be added;

circuit means in each said stage connected for feeding said signals to said adder and selectively and mutually exclusively providing the bit by bit complement of one digit and adding a particular number to one of the two digits;

a second adder in each said stage connected so that its output provides said new decimal digit;

second circuit means in each said stage for selectively passing direct or complement of the output of said first adder as one input to said second adder;

third circuit means in each said stage for selectively passing or suppressing signals representing a fixed number to said second adder and equivalent to a subtraction of the number as added by operation of the first circuit means;

circuit means for connecting the carry output of each first adder to the carry input of the first adder of the stage forming the next higer significant decimal digit; and a controller common to all stages and connected to be responsive to the sign bits of numbers whose digits are fed to said stages and providing control signals for control of the selectivity of said first circuit means and further providing other control signals for control of the selectivity of said second circuit means, the controller additionally providing a sign bit for the number as assembled by operation of all said stages.

2. A decimal adder as in claim 1, wherein the adders perform addition modulo a number which is the sum of said particular number and of said fixed number.

3. A decimal adder as in claim 2, said third circuit means being controlled in response to production of an overflow − carry bit by said first adder.

4. A decimal adder as in claim 3, said third circuit means being controlled additionally by said controller when responding to sign bits signifying addition of two positive or of two negative numbers, to obtain the addition of the fixed number in the second adder when the first adder produces said carry bit, said first circuit means being controlled to obtain addition of said particular number.

5. A decimal adder as in claim 3, said third circuit means being controlled additionally by said controller when responding to sign bits signifying subtraction and an overall negative result to obtain the addition of the fixed number when the first adder produces said carry bit, the first circuit means being controlled so that the particular number is not added.

6. A decimal adder as in claim 31, said third circuit means being controlled additionally by said controller when responding to sign bits signifying subtraction and an overall positive result to suppress addition of the fixed number when the first adder produces said carry bit, the first circuit means being controlled so that the particular number is not added.

7. A decimal adder as in claim 1, wherein the particular number is six, the fixed number is ten, each adder being a binary adder with four stages.

8. A decimal adder as in claim 1, said controller controlling the first and second circuit means in response to a subtraction with negative result for the respective formation of complements.

9. A decimal adder as in claim 8, the third circuit means in each stage being controlled in response to the carry produced by the first adder in the stage and in further response to complement forming of the output of the first adder as provided for all stages by the controller.

10. A decimal adder as in claim 1, said controller connected for receiving the carry output of the stage of highest significance and including a circuit forming the negative sign bit of the overall result concurrently with a control signal for all the second circuit means to obtain production of the complement of the output of the first adder.

11. A decimal adder as in claim 10, said controller feeding a complement of said control signal to the carry input of the stage of least significance.

12. A decimal adder as in claim 1, said first circuit means of all stages being controlled by said controller to obtain the adding of the particular number when the sign bits received by the controller are equal, the first circuit means of all stages being controlled by said controller to obtain complement forming of the one input number when the sign bits received by the controller are unequal.

13. A decimal adder as in claim 1, wherein the controller receives a carry bit of the stage forming the digit of highest significance, the controller providing a carry bit to the carry input of the stage forming the least significant digit;

means in the controller for setting the latter carry bit as provided by the controller to zero on the response to equal signs received by the controller; and means in the controller for causing the carry bit as provided by the controller to be the complement of a particular one of the control signals, the particular control signal being applied to all said second and third circuit means to respectively control the selectivity of operation of the second circuit means, the third circuit means in each stage being controlled as to passing or suppressing by the particular control signal and in further response to production or no production of carry bit by the first adder of the respective stage.

14. A decimal adder with one stage for each bcd digit to be generated from the bcd digit of two numbers applied to the decimal adder for the generation of a resultant number in accordance with a specified arithmetic operation, comprising:

a controller responsive to the sign bits of the numbers fed to the adder and generating a sign bit for the resultant number;

a binary adder in each stage for adding two bcd numbers and a carry bit when received to each other and providing the sum of its inputs as well as carry bit;

an input circuit for the adder in each stage receiving two bcd numbers and feeding them as two input numbers to said adder, and including means for generating selectively the 16-complement of one of the numbers;

a correcting stage in each arithmetic stage and connected for providing for the selective addition of ten to a number received and generating a bcd digit as output digit of the arithmetic stage, the output digit being a digit of the resultant number;

first circuit means in each arithmetic stage and being selectively operated for passing the output or its 16-complement of the adder to said correcting stage as number received;

second circuit means in the stage for controlling the selectivity of the selective addition in the correcting stage in response to the carry generated by the adder and in further response to the signs of the numbers as received by the controller;

third circuit means including the controller connected for controlling the selectivity of the first circuit means in response to the generation of the resultant sign bit from unequal signs bits as received by the controller; and further circuit means in the controller for controlling the input circuit means of all stages in response to in-equality of the sign bits of the numbers received the controller.

15. A decimal adder as in claim 14, wherein said third circuit means is responsive to the carry bit produced by the stage of highest significance participating in a subtraction, to control the sign bit for the resultant number in response thereto, and to provide a control signal to the first circuit means in each arithmetic unit to control the selectivity thereof in direct dependance upon the generation of the value of the resultant number sign bit.

16. A decimal adder as in claim 15, wherein the response to the signs by the second circuit means in each stage is carried out by the controller, said controller including means for responding (a) to said sign bits, and (b) to said carry bit of the stage of highest significance, said means for responding providing a control signal for controlling all of said first and second circuit means, the control signal being combined in each stage with the carry bit generated in the respective arithmetic stage for controlling the selective addition of ten by the correcting stage in each arithmetic stage.

17. A decimal adder as in claim 16, wherein the control signal as indicating generation of a negative sign bit of the resultant number and the carry bit generated in each stage as overflow of the respective adder therein are combined as exclusive or function for obtaining the addition of ten.

18. A decimal adder as in claim 14, wherein the second means controls the correcting stage so that for an addition, ten is in fact substracted from the numbers added together by the binary adder when producing a carry.

19. A decimal adder as in claim 18, wherein the input circuit provides an addition of six when the further circuit does not cause the generation of a 16-complement, the second circuit means as responding to the carry provided by the binary adder causing the addition of ten in the correcting circuit only when a carry is not produced in the case of addition identified by equal sign bits.

20. A decimal parallel adder comprising a plurality of arithmetic stages, one stage each for forming a new decimal digit, comprising:

first circuit means in each stage connected to receive signals representing first and second bcd digits and modifying the signals by selectively providing operation representing adding six to one of the digits or forming the difference between fifteen and one of the digits;

a first, four stage binary adder in each stage with carry input and carry output, the carry output of the first adder in a stage being connected to the carry input of the first adder in the stage forming a digit of next higher significance, the first adder in each stage connected to receive from the first circuit means of the stage signals representing the two digits as selectively modified by the first circuit means and providing signals representing the sum modulo sixteen thereof;

second circuit means in each stage connected to selectively produce, as an output, signals representing fifteen minus the sum as produced by the first adder or pass the signals representing the sum unmodified as output;

a second adder connected to receive said output of said second circuit means;

third circuit means in each stage connected to feed signals representing the number ten to said second adder; and control means connected to be responsive of sign bits for controlling the selectivity of said first, and second and circuit means in response to the sign bits received and in further response of the carry from the stage of highest significance.

21. A decimal adder as in claim 20, the control means including a circuit connected to be responsive to equality of the sign bits for controlling the first circuit means in all stages to provide for said adding of six, and for controlling said first circuit means in response to sign bit in-equality to provide for said forming-of-the difference operation thereof.

22. A decimal adder as in claim 21, wherein the control means includes means to provide a control signal in response to unequal sign bits and in further response to representation indicative of the sign of the result, the control signal being fed to the second circuit means in all stages for controlling selectivity thereof, further being fed to the third circuit means to control selectivity thereof in further response to the carry output of the first adder in the stage.

23. A decimal adder as in claim 22, wherein the control means responds to the carry signal from the highest stage as representation indicative of sign of the result, the control means further providing the complement of the control signal to the carry input of the least significant stage for unequal sign bits.

* * * * *